United States Patent [19]

Ninomiya

[11] Patent Number: 5,581,301
[45] Date of Patent: Dec. 3, 1996

[54] IMAGE PROCESSING APPARATUS WITH ADJUSTABLE LOW-PASS OPTICAL FILTER CHARACTERISTICS

[75] Inventor: Kunio Ninomiya, Kawasaki, Japan

[73] Assignee: Canon Kabushiki Kaisha, Tokyo, Japan

[21] Appl. No.: 479,578

[22] Filed: Jun. 7, 1995

Related U.S. Application Data

[63] Continuation of Ser. No. 126,752, Sep. 27, 1993, abandoned, which is a continuation of Ser. No. 770,424, Oct. 3, 1991, abandoned.

[30] Foreign Application Priority Data

| Oct. 3, 1990 | [JP] | Japan | 2-263951 |
| Nov. 2, 1990 | [JP] | Japan | 2-295213 |
| Dec. 11, 1990 | [JP] | Japan | 2-401358 |

[51] Int. Cl.$^6$ .................................... H04N 5/225
[52] U.S. Cl. .......................... 348/342; 348/231
[58] Field of Search ................... 348/207, 294, 348/239, 302, 311, 335, 342, 343, 344, 222, 231, 230, 218, 360; 359/558, 569; H04N 5/335

[56] References Cited

U.S. PATENT DOCUMENTS

| 3,784,734 | 1/1974 | Watanabe et al. | 358/55 |
| 3,821,795 | 6/1974 | Okano | 358/47 |
| 4,605,956 | 8/1986 | Lok | 358/44 |
| 4,743,100 | 5/1988 | Nakada et al. | 358/55 |
| 4,795,236 | 1/1989 | Ise | 358/331 |
| 4,805,028 | 2/1989 | Nishioka et al. | 358/225 |
| 5,029,010 | 7/1991 | Shiraishi | 358/225 |

FOREIGN PATENT DOCUMENTS

| 324-107A | 7/1989 | European Pat. Off. ....... H04N 9/040 |

*Primary Examiner*—Wendy Garber
*Assistant Examiner*—Tuan V. Ho
*Attorney, Agent, or Firm*—Fitzpatrick, Cella, Harper & Scinto

[57] ABSTRACT

An image processing apparatus capable of thinning data obtained by a solid-state image pickup device having a certain resolution. The apparatus includes an optical low-pass filter mounted in front of the solid-state image pickup device in an optical focusing system, the low-pass filter having an alterable optical transmittance characteristic relative to a spatial frequency, wherein the optical transmittance characteristic of the optical low-pass filter is changed between cases where all pixels of the solid-state image pickup device are output and cases where pixel data is thinned.

10 Claims, 5 Drawing Sheets

IMAGE PROCESSING APPARATUS WITH ADJUSTABLE LOW-PASS OPTICAL FILTER CHARACTERISTICS

This application is a continuation of application Ser. No. 08/126,752, filed Sep. 27, 1993, now abandoned, which was a continuation of application Ser. No. 07/770,424, filed Oct. 3, 1991, now abandoned.

BACKGROUND OF THE INVENTION

1. Field of the Invention

The present invention relates to an image processing apparatus capable of thinning data output from a solid-state image pickup device having a certain resolution.

2. Related Background Art

In a conventional image input apparatus having a solid-state image-pickup device, an optical low-pass filter is mounted in front of the image pickup device in order to exclude from an image signal produced by the device contain return noises of spatial sampling. An optical low-pass filter band-limits spatial frequencies higher than (½)f (mosaic filter) or (⅓)f (pure color vertical stripe filter) where f is a horizontal pixel drive frequency, although this depends upon an arrangement of color filters on the solid-state image pickup device.

In a conventional image input apparatus of the above-described type having an area sensor composed of 500×M horizontal pixels and 500×n vertical pixels, spatial frequencies higher than (½)f (MHz) or (⅓)f (MHz) are band-limited where f is a drive frequency for all pixels in one line. For example, in thinning 500×M horizontal pixels and 500×n vertical pixels of the area sensor into 500×M/M horizontal pixels and 500×n/n vertical pixels (where M and n are each an integer equal to at least 3 or 4 or larger), return noise components will be contained in the base band signal.

If such an image input apparatus is applied to a video camera for example, an image thinned into 500 horizontal pixels and 500 vertical pixels and displayed on a general monitor or EVF (electric viewfinder) has return noises with much moire. Therefore, it is difficult to adjust a focus, or the angle of view.

Apart from the above, in order to display pixel signals of the image pickup device on a monitor such as EVF, it is necessary to read all pixel signals synchronously with a television signal frequency. However, as the number of total pixels of the device is increased for high resolution, the drive frequency for driving the device becomes considerably quite high. Furthermore, as the drive frequency becomes high, it becomes difficult to obtain sufficient frequency characteristics of signal processing circuits including such as a sample/hold (S/H) circuit, amplifier, analog/digital converter, and memory, resulting in a complicated circuit arrangement and high cost, even where only poor performance is attained.

SUMMARY OF THE INVENTION

It is therefore an object of the present invention to solve the above problems and provide an image processing apparatus capable of outputting an image of high quality even when thinning an output of an image pickup device.

In order to achieve the above object, an embodiment of the present invention provides an image processing apparatus capable of thinning data obtained by a solid-state image pickup device having a certain resolution. The apparatus includes an optical low-pass filter mounted in front of the solid-state image pickup device in an optical focussing system, the low-pass filter having an alterable optical transmittance characteristic relative to a spatial frequency, wherein the optical transmittance characteristic of the optical low-pass filter is changed between for the case where all pixels of the solid-state image pickup device are output and for the case where pixel data is thinned.

According to this embodiment, in an image processing apparatus capable of thinning data obtained by a solid-state image pickup device having a certain resolution, an optical low-pass filter is mounted in front of the solid-state image pickup device in an optical focussing system, the low-pass filter having an alterable optical transmittance characteristic relative to a spatial frequency, wherein the optical transmittance characteristic of the optical low-pass filter is changed between cases where all pixels of the solid-state image pickup device are output and cases where pixel data is thinned. It is therefore possible to eliminate moire to be caused by return noises contained in an image signal during a thinning mode. Thus, an image displayed on an EVF or a general monitor has a high quality without moire, even during the thinning mode.

According to another embodiment of the image pickup apparatus of the present invention, the apparatus has a solid-state image pickup device, a first memory for storing signals sequentially read from the device, a control circuit for controlling to read the signals stored in the first memory while thinning it at a predetermined period, a second memory for storing the thinned signals read from the first memory, and a process circuit for processing the signal read from the second memory synchronously with a predetermined television signal system, deriving a luminance signal and displaying a monochrome image on a monitor.

In the image pickup apparatus of this embodiment, signals sequentially read from the solid-state image pickup device are stored in the memory, and the signals stored in the memory are read while thinning it at a predetermined period. Therefore, the quality of an image used for focus adjustment or view angle adjustment is not degraded.

It is a second object of the present invention to provide a solid-state image pickup apparatus capable of realizing a monitor signal processing circuit easily even when using a relatively high pixel number image pickup device.

In order to achieve the above object, another embodiment of the present invention provides a solid-state image pickup apparatus having a solid-state image pickup device having a number of solid-state image pickup elements including nP and mP elements respectively in the horizontal and vertical directions, where n, m>1 and P represents the standard number of pixels of the solid-state image pickup device respectively in the horizontal and vertical directions, the standard number of pixels providing a standard television signal, the solid-state image pickup device comprising: reading means for sequentially reading pixel data at each of rows n, 2n, 3n, . . . asynchronously with a television signal system; first memory means for storing the pixel data at each of rows at each of corresponding addresses; and read controlling means for reading the pixel data stored in the first memory means while thinning the pixel data into P pixel data respectively in the horizontal and vertical directions.

The solid-state image pickup apparatus may further comprise a second memory means for storing the thinned P pixel data read from the first memory means, and the pixel data in the second memory means may be used to generate an image signal which is output to monitor means, thereby further improving the performance of the apparatus.

According to this embodiment, it is relatively easy to realize a signal processing circuit for the solid-state image pickup apparatus having a solid-state image pickup device having a large number of high resolution pixels. It is also possible to easily adjust the angle of view, focus, and the like in the case the thinned signals in the second memory are read synchronously with a television signal, D/A converted, and displayed on monitor means such as an EVF.

These and other objects and advantages of the present invention will become more apparent from the following detailed description and accompanying drawings.

DETAILED DESCRIPTION OF THE PREFERRED EMBODIMENTS

Figure 1:
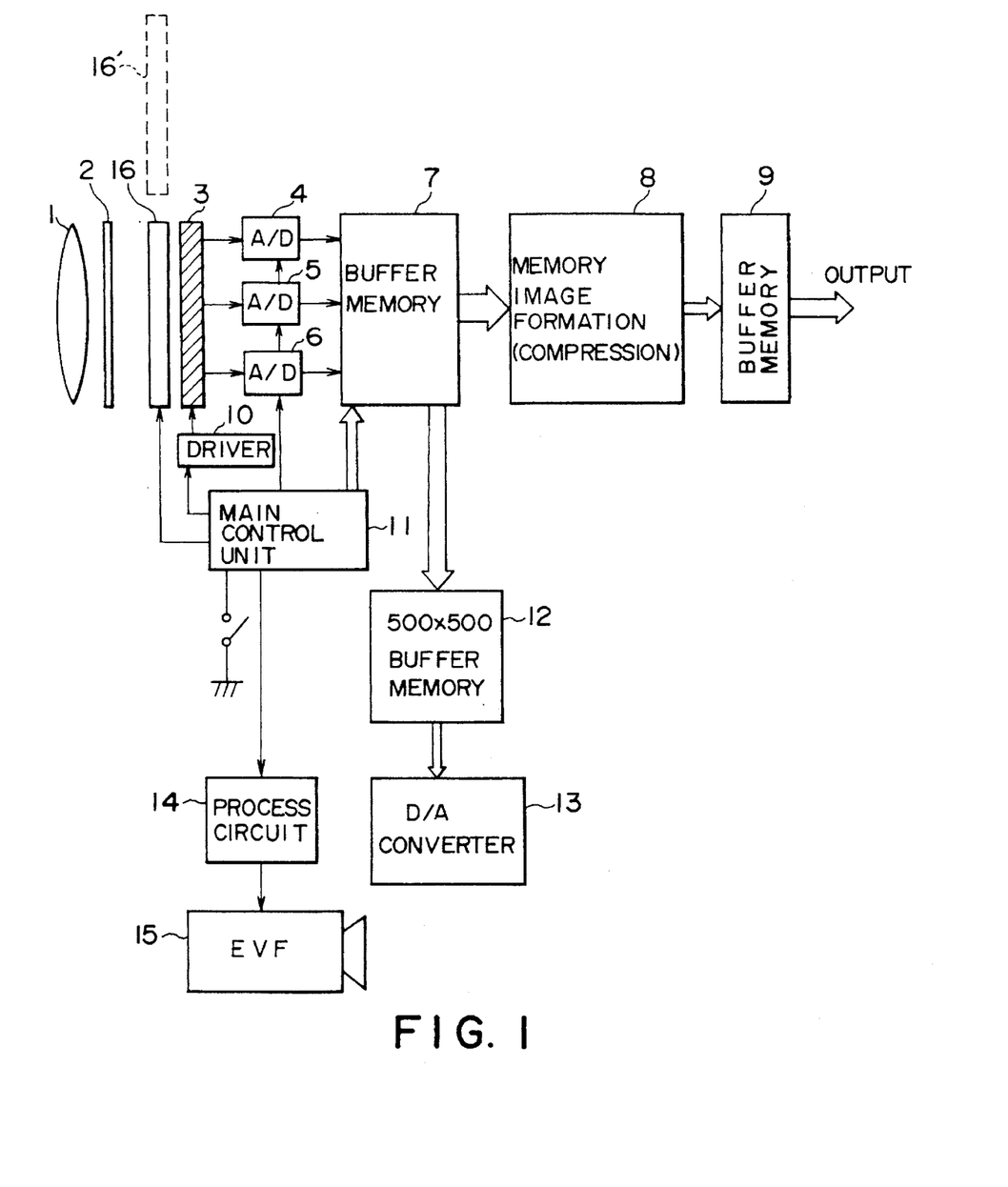
FIG. 1 is a block diagram showing an embodiment of the present invention.

FIG. 1 shows the structure of an image processing apparatus according to the present invention.

Referring to FIG. 1, reference numeral 1 represents a lens, reference numeral 2 represents a shutter for controlling an exposure amount, and reference numeral 3 represents a solid-state image pickup device (area sensor) having 500×M pixels in the horizontal direction and 500×n pixels in the vertical direction where M and N an integer 3 or 4 or larger. Between the shutter 2 and the solid-state image pickup device 3, there is provided an optical low-pass filter 16 which will be later described.

Output signals from the solid-state image pickup device 3 are A/D-converted by A/D converters 4, 5, and 6 into multi-value digital signals which are stored in a buffer memory 7.

A memory 8 uses the data stored in the buffer memory 7 to perform a predetermined image forming process and compressing process. Image data stored in the memory 8 is output via a buffer memory 9.

The solid-state image pickup device 3 is driven and controlled by a main control unit 11 via a driver circuit 10. The main control unit 11 controls the whole system of the apparatus and is constructed of a microprocessor and other circuits.

In this embodiment, digital image data output from the solid-state image pickup device 3 and stored in the buffer memory 7 is arranged to be capable of being thinned approximately into 500 M/M pixels and 500 n/n pixels respectively in the horizontal and vertical directions, i.e., being thinned into 500×500 pixels. Reference numeral 12 represents a buffer memory for storing a thinned image. Thinning control is executed by the main control unit 11 by controlling data read from the solid-state image pickup device 3.

In applying this image processing apparatus to a video camera for example, the thinned image data stored in the buffer memory 12 is converted into an analog signal by a D/A converter 13, and thereafter is subject to a predetermined image processing by a process circuit 14 to output the processed image data to an electric viewfinder EVF 15.

The optical low-filter 16 limits a spatial frequency range of the solid-state image pickup device 3. The characteristics of the optical low-pass filter 16 are selected by a switch 17 for one of the two cases, one driving all pixels of the area sensor, the other driving the sensor by thinning into 500 M/M and 500 n/n pixels.

Figure 2:
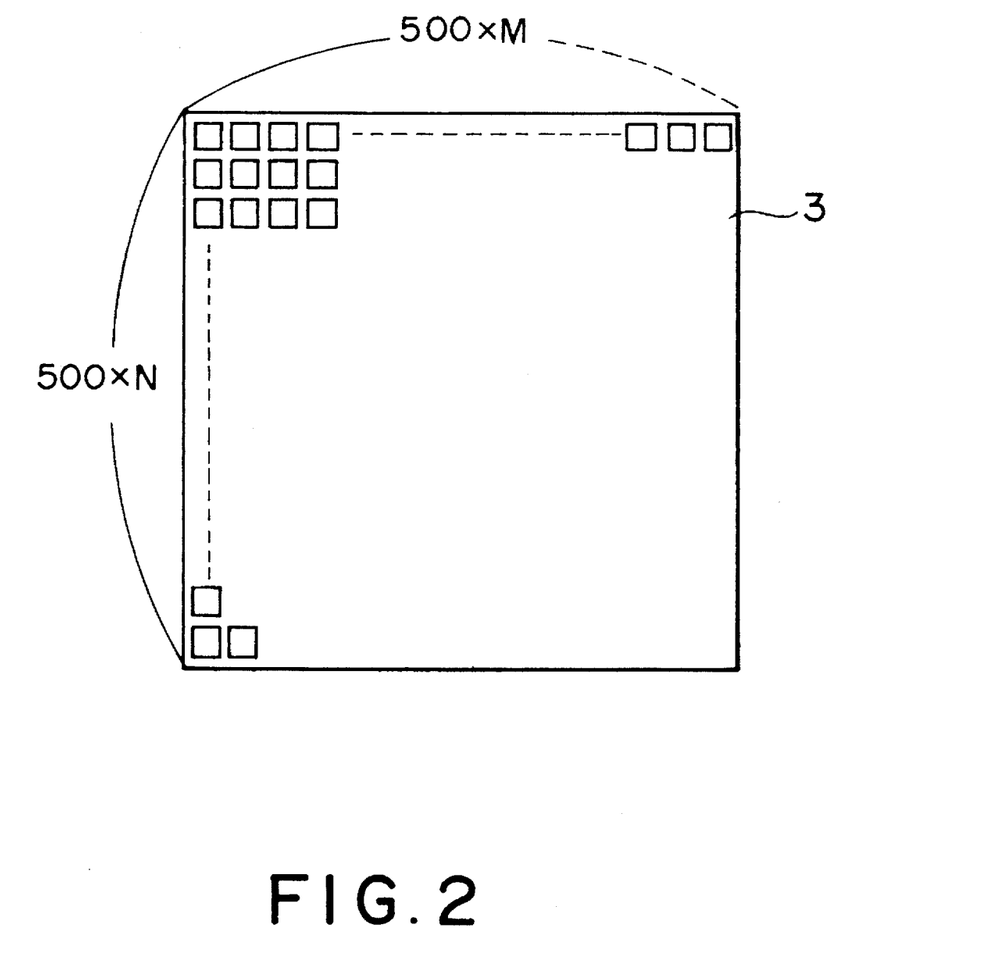
FIG. 2 illustrates a solid-state image pickup apparatus.

More in particular, as shown in FIG. 2, the characteristics of the optical low-pass filter 16 limiting the spatial frequency range are selected between two modes. In one mode all pixels of the solid-state image pickup device 3 including 500×M horizontal pixels and 500×n vertical pixels are driven to output corresponding image signals. In the other mode, horizontal pixels are thinned into 500 M/M pixels and vertical pixels are thinned into 500 n/n pixels to output corresponding image signals.

Selection of the characteristics of the optical low-pass filter 16 can be carried out, for example, by exchanging a plurality of filter elements disposed in front of the solid-state image pickup device 3. Alternatively, the optical characteristics of the filter 16 may be changed physically using liquid crystal panels or the like.

The number of thinning modes may be increased by selectively using one of a plurality of numbers M's and n's. In such a case, there is used one of a plurality of low-pass filters such as shown at 16 and 16' in FIG. 1, suitable for a selected thinning mode, or if necessary, a plurality of low-pass filters may be used superposed one upon another. In thinning pixels by 1/n, every n-th pixel is sampled.

The operation of the image processing apparatus constructed as above will be described.

When the switch 17 is turned on, all pixel signals are output from the solid-state image pickup device 3, while a subject image is focus upon the device 3 via lens optical systems 1, 2, and 16 and the main control unit 11 supplies the drive pulse to the device 3 via the driver circuit 10.

Output signals from the solid-state image pickup device 3 are converted by the A/D converters 4 to 6 into digital signals and stored in the buffer memory 7.

The digital image signal stored in the buffer memory 7 is sent to the memory image formation circuit 8 where it is subjected to a predetermined image forming and compressing process and output from the buffer memory 9.

Figure 3:
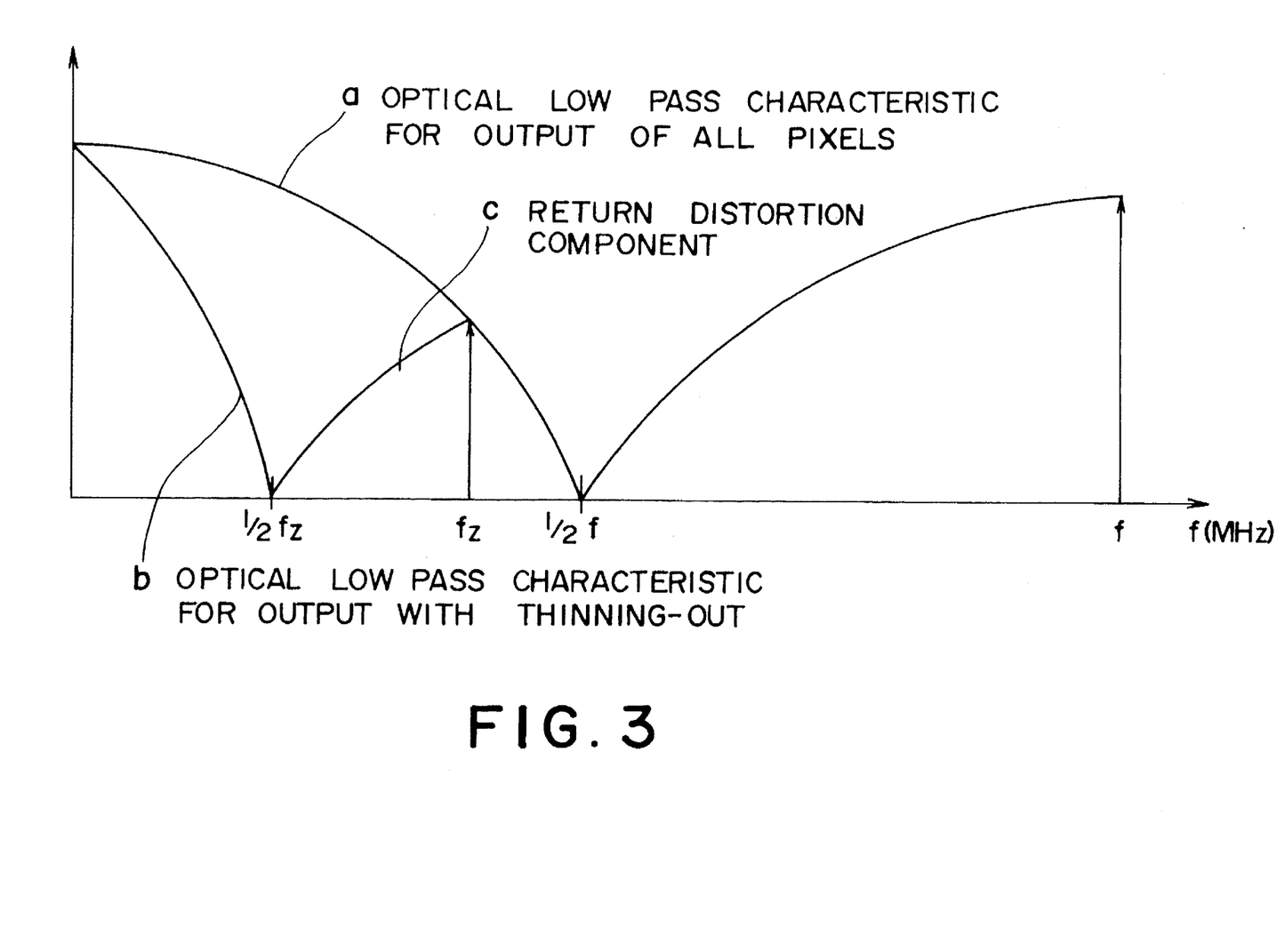
FIG. 3 shows a spatial frequency characteristic of an optical filer used in the embodiment of FIG. 1.

The optical low-pass filter characteristic in this normal mode is shown indicated at reference character a in FIG. 3. With this characteristic, frequencies up to the Nyquist frequency (½)f are allowed to pass, where f (MHz) is a drive frequency for horizontal pixels (500×M in one row) of the area sensor.

When the switch 17 is turned off, an image is output while being thinned. The solid-state image pickup device 3 is controlled to read data upon application of control signals from the main control unit 11 and the driver circuit 10. Pixels are thinned into 500 M/M and 500 n/n respectively in the horizontal and vertical directions to output corresponding image signals from the area sensor. The thinned image signals are stored via the A/D converters 4 to 6 into the buffer memory 7.

The thinned digital signal is sent to the D/A converter 13 where they are converted into an analog image signal, and thereafter are sent to the process circuit 14 which is for carrying out a predetermined video processing.

The analog signal subject to the video processing (conversion into a television rate) at the process circuit 14 is then sent to EVF 15. While observing an image displayed on EVF 15, operator can adjust the angle of view, layout, or focus.

The characteristic of the optical low-pass filter 16 is switched to that indicated at reference character b in FIG. 3. With this characteristic, frequencies up to (½)fz are allowed to pass, where fz (MHz) is a drive frequency for thinned horizontal pixels.

The switch 17 can be used in the EVF 15 for adjusting composition and focus, wherein a signal is outputted by switching a mode to the all area sensor pixels output mode after the composition and focus are adjusted by setting the thinning mode.

As described above, the converting the optical low-pass filter of the lens optical systems to a filter having characteristics appropriate to the all-area sensor pixels output mode or the thinning-output mode according to the respective modes, return noise moire mixed in an image signal in the thinning mode can be avoided and a high quality picture without moiré can be obtained in the EVF and conventional monitors. For example, in application to a video camera, decision of composition and adjustment of focus can be precisely done in the EVF.

As appreciated from the foregoing description, according to the present invention, there is provided an image processing apparatus capable of thinning data obtained by a solid-state image pickup device having a certain resolution. The apparatus includes an optical low-pass filter mounted in front of the solid-state image pickup device in an optical focussing system, the low-pass filter having an alterable optical transmittance characteristic relative to a spatial frequency, wherein the optical transmittance characteristic of the optical low-pass filter is changed between cases where all pixels of the solid-state image pickup device are output and cases where pixel data is thinned. It is therefore possible to eliminate moiré to be caused by return noise contained in an image signal during a thinning mode. Thus, an image displayed on EVF or a general monitor has a high quality without moiré, even during the thinning mode.

Furthermore, according to this embodiment, an output from an image pickup device is stored in a memory, and the data stored in the memory is read while thinning it at a predetermined period. Therefore, color moiré caused by thinning or compression can be suppressed.

Figure 4:
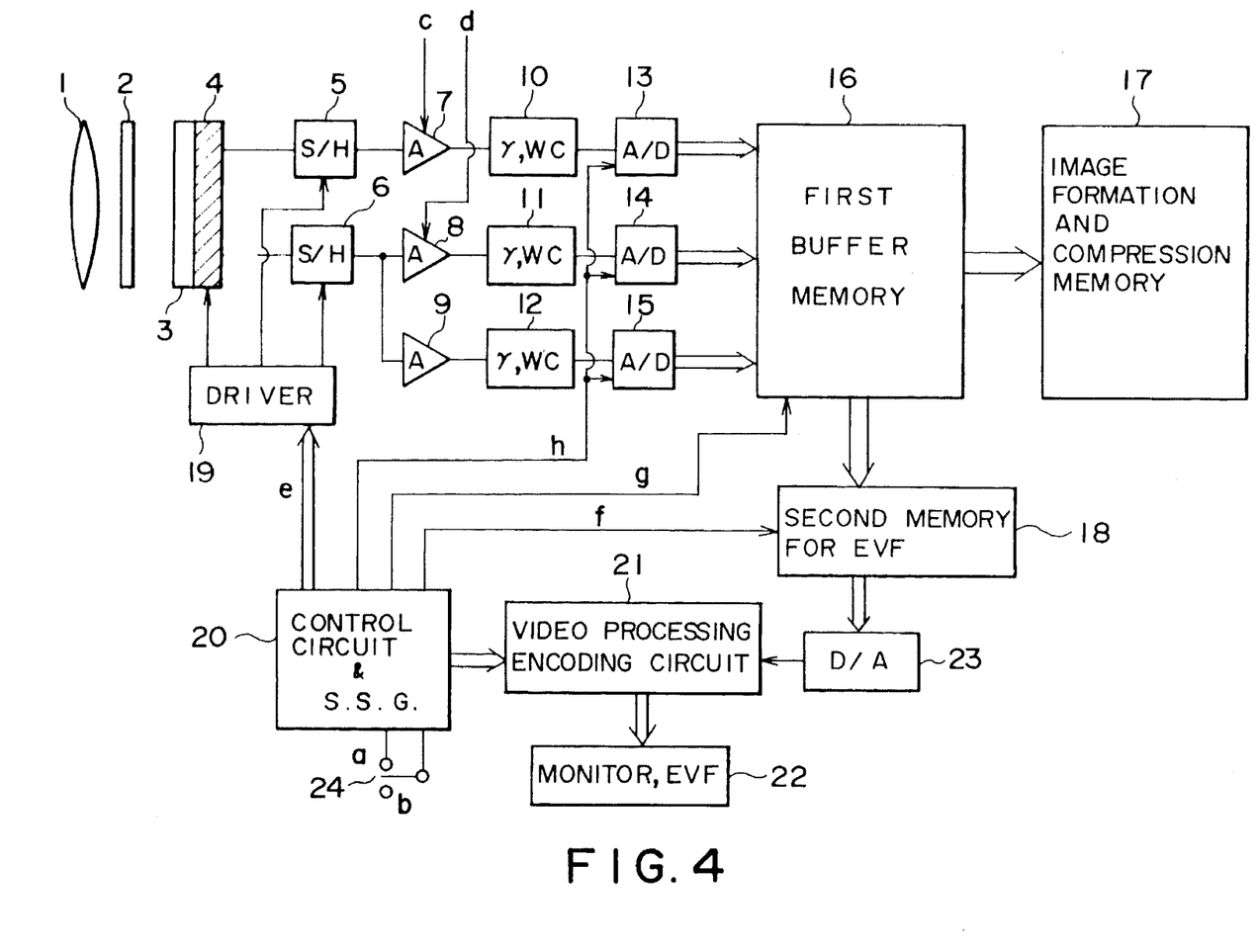
FIG. 4 is a circuit block diagram showing another embodiment of a solid-state image pickup apparatus.

Another embodiment of the present invention will be described. FIG. 4 is a circuit block diagram showing another embodiment of a solid-state image pickup device according to the present invention.

Reference numeral 1 represents a lens in an optical system, reference numeral 2 represents a shutter for controlling an exposure time, reference numeral 3 represents an optical low-pass filter (LPF) for regulating a spatial frequency, and reference numeral 4 represents a solid-state image pickup device having a great number of nP pixels and mP pixels respectively in the horizontal and vertical directions, the pixels being for high resoltuion applications. Reference numerals 5 and 6 represent a sample/hold (S/H) circuit, reference numerals 7, 8, and 9 represent a gain-controlled amplifier, reference numerals 10, 11, and 12 represent a video processing circuit for gamma correction, white clipping (WC), and the like, and reference numerals 13, 14, and 15 represent an A/D converter.

Reference numeral 16 represents a first buffer memory for storing A/D converted signals at rows n, 2n, 3n, ... at addresses corresponding to the rows, and reference numeral 17 represents a memory for forming an image or compressing it. Reference numeral 18 represents a second memory for monitor or EVF use for storing image signals stored in the first buffer memory 16 by thinning them into P pixels respectively in the horizontal and vertical directions. Reference numeral 19 represents a driver circuit for driving the solid-state image pickup device 4 and the S/H circuits 5 and 6. Reference numeral 20 represents a control circuit and system timing pulse signal generator (SSG) for controlling the solid-state image pickup device 4, S/H circuits 5 and 6, first and second memories 16 and 18, and other circuits. Reference numeral 21 represents a video processing encoding circuit, reference numeral 22 represents a monitor, EVF or the like, reference numeral 23 represents a D/A converter, and reference numeral 24 represents a control switch having contacts a and b.

The operation of the solid-state image pickup apparatus constructed as above will be described.

The apparatus enters an image pickup mode when the control switch 24 is switched to the contact b. A subject light passes through the lens 1, the exposure time of the subject light being controlled by the shutter 2, and the spatial frequency of the subject light being regulated by the optical LPF 3, and is focussed on the solid-state image pickup device 4.

A pulse asynchronous with a television signal is supplied from the control circuit and S.S.G. 20 via a line e to the driver 19 which in turn sends it to the solid-state image pickup device 4 as its drive signal. Each pixel signal of a subject image is converted into an electrical signal by the solid-state image pickup device 4 and read asynchronously with the television signal. The read signals are sampled and held by the S/H circuits 5 and 6 in response to a control signal from the driver 19, and then sent to the gain-controlled amplifiers 7, 8, and 9. The gains of the amplifiers 7 and 8 are controlled by control signals from lines c and d. The read signals are subject to gamma correction and white clipping by the image processing circuits 10, 11, and 12, and sent to the A/D converters 13, 14, and 15.

Digital signals converted from the analog signals by the A/D converters 13, 14, and 15 are written into the first buffer memory 16 in response to a control signal supplied via a line g from the control circuit and S.S.G. 20, and are sent to the image formation and compression memory 17.

The apparatus enters a monitor EVF output mode when the control switch 24 is switched to the contact a. Electrical image signals are written in the first buffer memory 16 in a manner similar to that described above.

The image signals in the first buffer memory 16 are thinned into P signals respectively in the horizontal and vertical directions in response to the control signal supplied via line g from the control circuit and S.S.G. 20, and written in the EVF second memory 18. The data written in the second memory 18 is read synchronously with the television signal in response to a control signal supplied via a line f from the control circuit 20.

The same data in the second memory 18 is read synchronously with the television signal until the first buffer memory 16 is overwritten. When all the data in the first memory 16 is overwritten, the data is thinned synchronously with the television signal, and sent to the second memory 18. In this case, the data is written in and read from the second memory 18 synchronously with the television signal.

The digital signal read from the second memory 18 is sent to the D/A converter 23 to convert the digital signal into an analog signal which is then encoded by the video processing encoding circuit 21 and outputted to a terminal 22 such a monitor, EVF, or the like to display the subject image.

Memory Writing/Reading Operation

Figure 5:
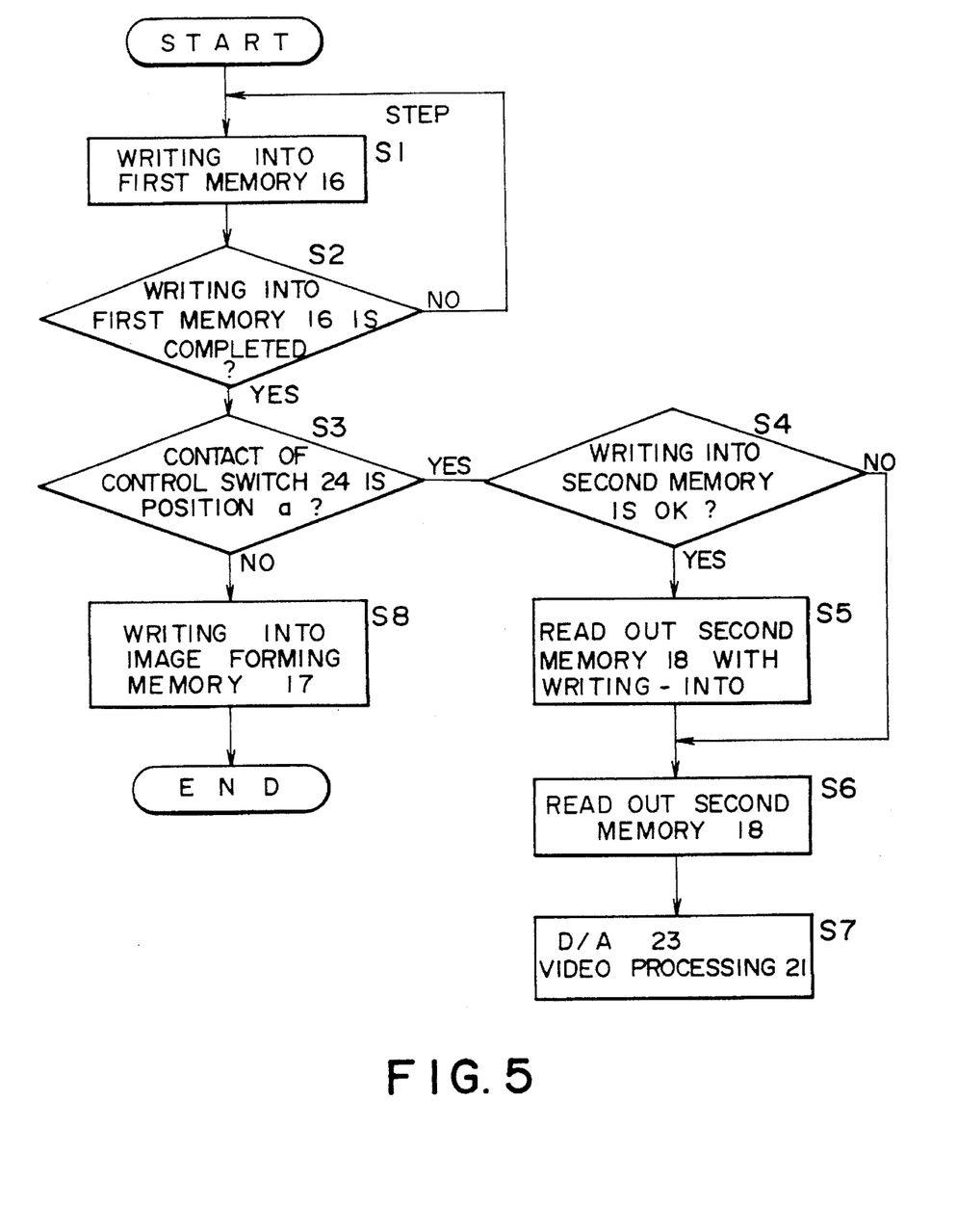
FIG. 5 is a flow chart illustrating the memory read/write operation of the embodiment of FIG. 4.

FIG. 5 is a flow chart showing the read/write sequence of the first buffer memory 16 and the EVF second memory 18. First, at step S1, all pixel data on the solid-state image pickup device 4 is written in the first memory 16. After completion of this data write at step S2, it is checked at step S3 if the control switch 24 selects contact a or b. If the switch 24 selects contact a for the monitor EVF output mode, the data thinned into P pixel data respectively in the horizontal and vertical directions is sent to the second memory 18 at step S4. If the second memory 18 is ready to be written, while the data in the first memory 16 is read, the data in the second memory 18 is read and sent to the video processing circuit 21 via the D/A converter 23. The second memory 18 is inhibited to write data until all pixel data of the next field is overwritten in the first buffer memory 16. At step S6 the thinned data is read synchronously with the television signal, and at step S7 is subject to D/A conversion and video processing to be displayed on the terminal such as a monitor, EVF, or the like.

When all pixel data are overwritten in the first memory 16, the second memory 18 is allowed to write data at step S4, and the data is written to and read from the second memory 18 at step S5.

If the control switch 24 selects contact b, all pixel data in the first memory 16 is written in the image formation memory 17 at step S8.

As described so far, the solid-state image pickup apparatus comprises a first memory means for storing pixel data at rows n, 2n, 3n, . . . of a solid-state image pickup device by a line, a control circuit for thinning pixel data stored in the first memory means in to P pixel data both in the horizontal and vertical directions, and a second memory means for storing the thinned P pixel data read from the first memory means. With such an arrangement, pixel data of the solid-state image pickup device of a high resolution having a number of pixels including n- and m-fold standard pixel numbers in the horizontal and vertical directions, can be read at a low speed asynchronously with a television signal to display an image on a monitor such as EVF. An image processing circuit can be realized relatively simply while allowing an operator to adjust the angle of view, a focus, or the like.

What is claimed is:

1. An image processing apparatus having a plurality of operation modes and including a solid-state image pickup device, comprising:

thinning means operative in one of the plurality of operation modes, data output from the solid-state image pickup device being thinned in that one operation mode so that a resolution thereof is reduced;

an optical low-pass filter mounted in front of the solid-state image pickup device, a frequency characteristic of said optical low-pass filter being able to be changed; and means for changing the frequency characteristic of said optical low-pass filter between the operation mode in which said thinning means is operated and the others of the operation modes.

2. An image processing apparatus according to claim 1, wherein said optical low-pass filter includes a plurality of filter plates, one of the plurality of filter plates being selectively inserted into an optical axis.

3. An image processing apparatus capable of thinning data obtained by a solid-state image pickup device having a certain resolution, comprising:

an optical low-pass filter mounted in front of the solid-state image pickup device in an optical focusing system, said low-pass filter having an alterable optical transmittance characteristic relative to a spacial frequency, first memory means for storing whole pixel data of the solid-state image pickup device;

second memory means for storing thinned pixel data of the solid-state image pickup device; and control means for controlling said first and second memory means, wherein said optical frequency characteristic of said optical low-pass filter is changed between a case where whole pixels of the solid-state image pickup device are output and a case where pixel data is thinned.

4. An imaging apparatus comprising:

(a) image pickup means for providing an image signal;

(b) optical means provided before said image pickup means, whose frequency characteristics is variable;

(c) signal processing means operative in one of a plurality of processing modes in which different signal processings are performed on a luminance signal provided by said image pickup means;

(d) control means for changing the frequency characteristics of said optical means according to which of said plurality of processing modes said signal processing means is operating in;

(e) first memory means for storing whole pixel data of said image pickup means;

(f) second memory means for storing thinned pixel data of said image pickup means; and (g) memory control means for controlling said first and second memory means.

5. An imaging apparatus according to claim 4, wherein a signal processing performed by said signal processing means includes a thinning processing.

6. An imaging apparatus according to claim 4, wherein said optical means further comprises an optical low-pass filter having a plurality of filter plates, one of the plurality of filter plates being selectively inserted into an optical axis.

7. An imaging apparatus according to claim 4, wherein said image pickup means further comprises a CCD.

8. An image processing apparatus comprising:

image pickup means for photoelectrically converting an optical image into an electrical signal;

thinning means for thinning the electrical signal to lower a resolution of the electrical signal:

optical filter means for reducing a predetermined optical frequency component;

control means for changing frequency characteristics of said optical filter means according to an operation of said thinning means:

first memory means for storing whole pixel data of said image pickup means;

second memory means for storing thinned pixel data of said image pickup means; and memory control means for controlling said first and second memory means.

9. An apparatus according to claim 8, wherein said thinning means includes a memory.

10. An apparatus according to claim 9, wherein said thinning means thins out the electrical signal from said image pickup means and stores the thinned signal in said memory.

* * * * *

UNITED STATES PATENT AND TRADEMARK OFFICE
CERTIFICATE OF CORRECTION

PATENT NO. : 5,581,301

DATED : December 3, 1996

INVENTOR(S) : KUNIO NINOMIYA

It is certified that error appears in the above-identified patent and that said Letters Patent is hereby corrected as shown below: On the title page, the bottom half of the illustrative figure, and sheet 1 of 5, the bottom half of FIG. 1 should be:

FIG. 1

UNITED STATES PATENT AND TRADEMARK OFFICE
CERTIFICATE OF CORRECTION

PATENT NO. : 5,581,301

DATED : December 3, 1996

INVENTOR(S): KUNIO NINOMIYA

It is certified that error appears in the above-identified patent and that said Letters Patent is hereby corrected as shown below:

Item
[56] REFERENCES CITED

U.S. Patent Documents, "Lok" should read --Cok--.
Foreign Patent Documents, "324-107A" should
   read --324107A--.

COLUMN 1

Line 21, "contain" should be deleted and "of" should
   read --caused by--.
Line 49, "considerably" should be deleted.

COLUMN 2

Line 1, "focussing" should read --focusing--.
Line 12, "focussing" should read --focusing--.

COLUMN 3

Line 19, "filer" should read --filter--.
Line 36, "N an integer" should read --n are integers--.

COLUMN 4

Line 3, "low-filter 16" should read --low-pass filter 16--.
Line 35, "focus" should read --focused--.

UNITED STATES PATENT AND TRADEMARK OFFICE
CERTIFICATE OF CORRECTION

PATENT NO. : 5,581,301

DATED : December 3, 1996

INVENTOR(S) : KUNIO NINOMIYA

It is certified that error appears in the above-identified patent and that said Letters Patent is hereby corrected as shown below:

COLUMN 5

Line 17, "moire" should read --(moiré)--.
Line 29, "focussing" should read --focusing--.

COLUMN 6

Line 21, "focussed" should read --focused--.
Line 66, "such" should read --such as--.

COLUMN 7

Line 31, "in to" should read --into--.
Line 39, "EVF." should read --an EVF.--.

Signed and Sealed this

Fifteenth Day of July, 1997

Attest:

BRUCE LEHMAN

Attesting Officer

Commissioner of Patents and Trademarks